United States Patent [19]
Fitzsimmons et al.

[11] Patent Number: 5,632,374
[45] Date of Patent: May 27, 1997

[54] COMPACT DISC TRANSFER STATION

[75] Inventors: Tyler Fitzsimmons, South Portland, Me.; Steven E. Callahan, Sutton, Mass.; Todd K. Dyment, Leominster, Mass.; Jon Noce, Haverhill, Mass.

[73] Assignee: Microplas, Inc., Clinton, Mass.

[21] Appl. No.: 568,819

[22] Filed: Dec. 7, 1995

[51] Int. Cl.$^6$ ................................................ B65D 85/57
[52] U.S. Cl. ........................ 206/308.1; 206/564; 206/454; 211/40; 211/41.12
[58] Field of Search ........................... 206/308.1, 454, 206/564, 710, 740, 832; 211/40, 41

[56] References Cited

U.S. PATENT DOCUMENTS

| | | |
|---|---|---|
| 2,553,117 | 5/1951 | Simmons . |
| 3,306,462 | 2/1967 | Cruz ................................ 206/564 |
| 3,591,032 | 7/1971 | Baxter .............................. 206/564 |
| 3,768,639 | 10/1973 | Dogliotti ......................... 206/564 |
| 4,484,538 | 11/1984 | Sarkozy et al. . |
| 4,588,086 | 5/1986 | Coe . |
| 4,623,064 | 11/1986 | Ruda . |
| 4,676,372 | 6/1987 | Rager . |
| 4,776,463 | 10/1988 | Press . |
| 4,796,756 | 1/1989 | Ott .................................... 206/454 |
| 5,170,893 | 12/1992 | Smith . |
| 5,333,741 | 8/1994 | Yang . |

Primary Examiner—David T. Fidei
Attorney, Agent, or Firm—James Creighton Wray

[57] ABSTRACT

A holder for temporarily storing and displaying compact discs has a front, a back and a disc-receiving base sloping downward from the back to the front. The disc-receiving base has molded pockets or slots for receiving and vertically supporting the compact discs. Each pocket has a lead-in for quick drop-off of a disc and for guiding it to a trough at the bottom. The trough contacts the flat sides of the disc but does not touch the information containing regions on the programmed side. Three bumps extend inward from the walls of the trough for orienting the disc at a rearward leaning angle to enhance visual identification and to prevent the discs from tilting forward and becoming dislodged. Effective disc orientation is achieved by providing a straight slot, with no bumps, that is molded at the desired angle of disc tilt or inclination. The pockets have openings that are wider than the thicknesses of standard compact discs. The pockets are arranged in staggered rows to offset the discs and to allow for visual identification of the discs. Curved depressions are positioned in the disc-receiving base of the holder. The depressions extend from the back to the front through the central regions of the rows of pockets. Those depressions guide and center discs being deposited, keep the pocket edges away from the recorded surfaces on the discs and allow movements of the discs once the discs have been slightly lifted. The holder has side walls with anti-skid feet for connecting the holder to other similar holders.

23 Claims, 3 Drawing Sheets

COMPACT DISC TRANSFER STATION

BACKGROUND OF THE INVENTION

This invention relates to holders for temporarily storing and displaying compact discs.

Compact discs are packaged, sold and stored in plastic Jewel boxes or cases made of plastic, paperboard, or a combination of plastic and paperboard. For long term storage, Jewel boxes containing the discs are stacked or filed in cabinets or stands positioned near the using apparatus, such as a computer workstation having a CD-ROM, or a stereo compact disc player. Maintaining the integrity and future unadulterated performance of the discs require that the information carrying surfaces of the discs not contact desk tops, tables, or other surfaces that may scratch the discs or from which or on which the discs may fall or be damaged. Users, however, have demonstrated an unwillingness to return the discs to their Jewel boxes after use, especially in situations where the contents of the disc may be performed again. Returning the discs to the correct Jewel boxes and correctly refiling the Jewel boxes is inconvenient and requires time that often is not available to the user. Removing discs from Jewel boxes also requires time and interruption. Users prefer to have the discs lying at their fingertips and are willing to sacrifice damage to the discs in return for rapid, easy access. Needs exist for holders for temporarily storing discs that are easy to use, that stably secure the discs and that prevent or limit surface contact with the encoded sides of the discs.

Existing storage and display holders do not provide for easy user identification and selection of the stored discs. The discs may be so deeply entrenched in the holder that visual identification is difficult. Additionally, by inserting a large percentage of the disc in the holder, the risk of scratching the recorded surfaces of the discs increases. Needs exist for storage and display stations that provide maximum visual access to the disc while still securely holding the discs in place.

Cost plays a major factor in consumer selection of storage and display devices. Consumers demand attractive items that are not only rugged and easily transportable but also that are reasonable in cost. Needs exist for storage and display stations that are appealing to consumers in both looks and price.

SUMMARY OF THE INVENTION

A one-piece molded transfer station offers a simple, quick and safe harbor for temporarily storing and displaying discs. The station is stable, provides the user with excellent visual identification of the displayed discs and is easy to use.

The present invention provides a safe means to store discs, when refiling the discs in Jewel boxes or catalogs is not appropriate. The station becomes a staging area for discs between use and storage and offers an attractive alternative to laying discs on a desk, table, cabinet or other surfaces. The present invention has applications in every instance where multiple discs are used, including parties and night clubs where disc jockeys continuously shuffle compact discs. The present invention is also economically attractive, as the station is manufactured from a one-piece mold.

Each station has a base that includes multiple rows pockets for receiving discs. The base preferably slopes upward from front to back and has curved front and back edges, thereby creating a "Grandstand" or stadium shaped station. Having that configuration, the discs extend progressively higher from front to back, thereby providing enhanced visual access to the identifying features of the discs. The rows of pockets are preferably staggered to permit better access and easier removal and insertion of a disc without contacting adjacent or surrounding discs. In one preferred embodiment, the station has four rows of pockets, with each row including four pockets. Preferably, the sides of the station have connectors, such as connecting feet, that permit identical stations to be connected to each side. That provides for multiple station assemblies and permits the user to create different size assemblies that are appropriate to meet situational requirements.

Multiple curved depressions extend from the front to the back in the upper surface of the base. The curved depressions extend through central regions of the rows of pockets and function to keep holder edges away from the recorded surfaces on the discs, to guide the discs into holding troughs and to permit horizontal movement of the discs once the discs have been slightly lifted.

The discs are securely held in generally vertical positions in the pockets. Each pocket has a generous lead-in for quick drop-off of a disc. At the bottom of the lead-in is a curved trough that is preferably about 0.045 inches deep. The lower portion of the disc sits in the trough. Although the sides of the trough contact the flat surfaces, or sides, of the disc, the trough never comes in contact with the information carrying or encoded region of the disc surface. The pockets are wider than the discs, thereby preventing interference and damage hazards associated with a tight fit. The walls and trough of each pocket may have reliefs for permitting the free flow of air or moisture out of the pockets.

Preferably, three small bumps are positioned in each trough for orienting the disc at an angle. Preferably, first and second bumps are positioned on the front surface of the trough and a third bump is positioned on the back surface of the trough between the first and second bumps. The curved trough makes the first and second front bumps higher than the third rear bump. That configuration urges an inserted disc to be tilted slightly backward, thereby providing the user with enhanced visual access to the identifying surface of the disc. The bumps ensure that the disc is consistently tilted backward and prevent forward tilting when the disc is touched or when the station is moved or bumped.

In a preferred embodiment, first and second bumps are positioned on either end of the front side of the trough and a third bump is positioned near the middle of the back side of the trough close to the bottom. The third bump pushes the lowest point of the disc forward. The first and second bumps push the front side, or encoded surface, of the disc backwards, thereby forcing the disc into a rearwardly-tilting position.

In another preferred embodiment, a rearward tilt of the disc is accomplished by molding a straight trough with walls having a desired angle of slope. That is accomplished by rotating the station in the mold so that the pockets are molded in the direction of draw.

The transfer station apparatus for storing and displaying compact discs includes a disc-receiving base having a front edge, a back edge, a left edge and a right edge. A support extends downward from edges of the disc-receiving base. The support may include a front extending downward from the front edge of the disc-receiving base and a back extending downward from the back edge of the disc-receiving base. Pockets for receiving compact discs are positioned in the disc-receiving base. Each pocket includes a first lead-in wall extending inward and downward from the disc-receiving base toward a center of the pocket, a second lead-in wall extending inward and downward from the disc-receiving base toward the center of the pocket, and a trough connected to and positioned between bottoms of the first and second walls for receiving lower sides and edges of the disc. The trough has dimensions for contacting non-recorded flat peripheral surfaces of the disc.

The pockets are preferably arranged in rows extending between the back edge to the front edge of the transfer station. In one preferred embodiment, pockets are arranged in first and second rows, and the pockets are positioned in a staggered configuration. In another preferred embodiment, the pockets are arranged in first, second, third and fourth rows, and the rows are staggered such that the first and third rows and the second and fourth rows are generally at the same level.

Each pocket preferably has a width that is greater than a width of a standard compact disc.

In one preferred embodiment, each pocket includes multiple bumps extending inward from the first and second walls for orienting a compact disc at a backward-tilting angle. The multiple bumps preferably include three bumps, with the first bump extending inward from a left side of the first wall, the second bump extending inward from a right side of the first wall and the third bump extending inward from a middle portion of the second wall. The third bump is preferably positioned at a lower portion of the pocket such that the third bump pushes a lowest part of a compact disc forward when the disc is fully inserted in the pocket. The first and second bumps extend inward at a position above the third bump for pushing a front, nonrecorded side of the compact disc backwards.

In another embodiment of the present invention, each pocket is a generally straight slot having the first and second walls extending downward at an angle substantially parallel to one other.

Curved depressions extend from the front edge to the back edge of the station in the disc-receiving base of the station. The number of depressions preferably equals the number of rows, with a single depression extending through central regions of the pockets in each row.

In a preferred embodiment, the back of the station is higher than the front, thereby causing the disc-receiving base to slope downward from the back to the front. The front and the back are preferably curved, with the front and back edges of the disc-receiving base curved to follow the front and back. The curved depressions follow radii of the front and back edges of the disc-receiving surface.

Preferably, the holder further includes sides extending downward from side edges of the disc-receiving base. At least one connector is preferably positioned on at least one of the sides of the holder for connecting multiple holders together. In one preferred embodiment, the connector is an anti-skid foot.

In a preferred embodiment of the present invention, the front includes a first part that slopes outward and downward from the front edge of the base and a substantially vertical part extending downward from a lower edge of the first part. The back includes a first segment that slopes outward and downward from the back edge of the base and a substantially vertical segment extending downward from a bottom edge of the first segment. The side walls extend downward from side edges of the base, with each side wall joining outer edges of the front and back walls.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
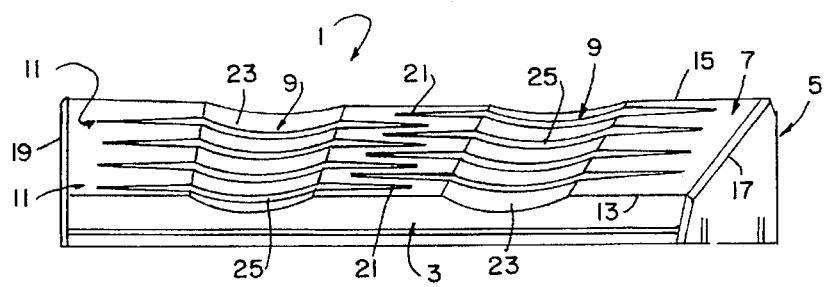
FIG. 1 is a front view of a preferred embodiment of the transfer station.

Referring to the drawings and to FIGS. 1–10, a transfer station 1 includes a front 3, a back 5 and a disc-receiving base 7 extending between the front 3 and the back 5. The disc-receiving base 7 has rows 9 of pockets 11 for receiving and holding lower parts of compact discs. Each pocket 11 preferably has a width that is greater than a width of a standard disc. There are numerous possible options for the number of rows 9, the number of pockets 11 in each row 9 and the positioning of the pockets 11 and rows 9, and the embodiments provided are only exemplary and do not serve to limit the possible configurations for the present invention.

FIGS. 1–6 show one preferred embodiment of the transfer station 1. The disc-receiving base 7 has a front edge 13, a back edge 15 and a pair of side edges 17, 19. The disc-receiving base 7 slopes downward from back to front such that the back edge 15 is higher than the front edge 13. That enhances visual identification of the discs and reduces size of the holder, while maintaining effective disc separation. Two rows 9 of pockets 11 are positioned in the base 7.

Figure 2:
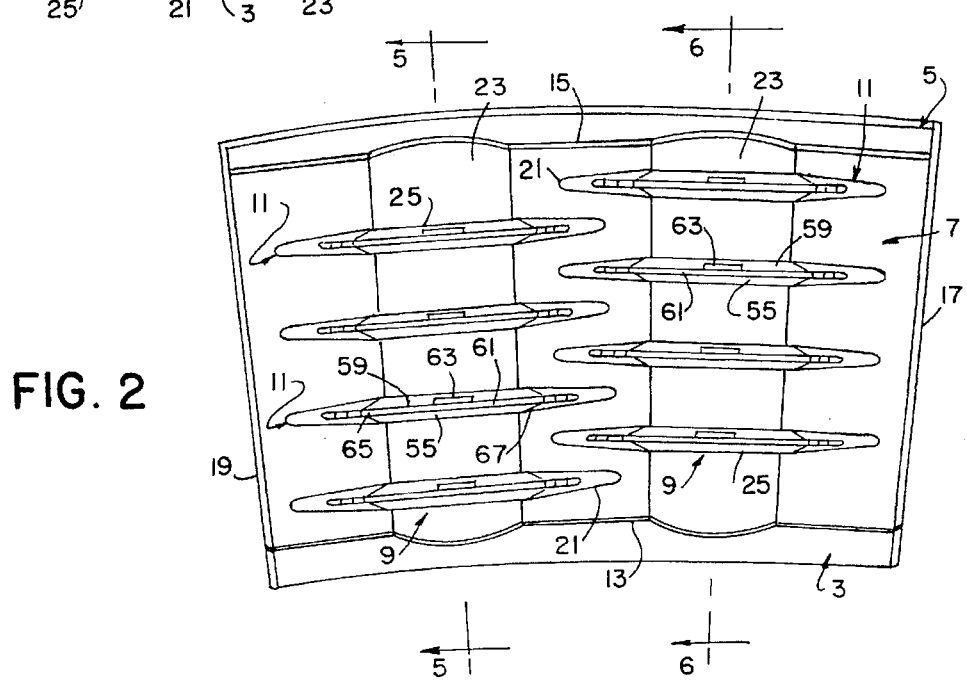
FIG. 2 is a plan view of the transfer station of FIG. 1.

As shown in FIG. 2, the pockets 11 are staggered and the end regions 21 of the pockets 11 preferably extend between end regions 21 of pockets 11 from the adjacent row. That allows for a smaller, more compact transfer station 1. A curved depression 23 extends through central regions 25 of each pocket 11. Preferably, a single curved depression 23 extends through each row 9 of pockets 11 from the back edge 15 to the front edge 13 of the base 7. In embodiments where the back edge 15 and front edge 13 of the base 7 are curved, the curved depressions 23 follow the radii of the front and back edges. The depressions avoid contact with recorded surfaces and speed insertion and removal of discs.

As shown in FIG. 2, the back 5 preferably extends downward and outward from the back edge 15 of the base 7 and the front 3 extends downward and outward from the front edge 13 of the base 7. That configuration improves the stability of the station 1.

Figure 3:
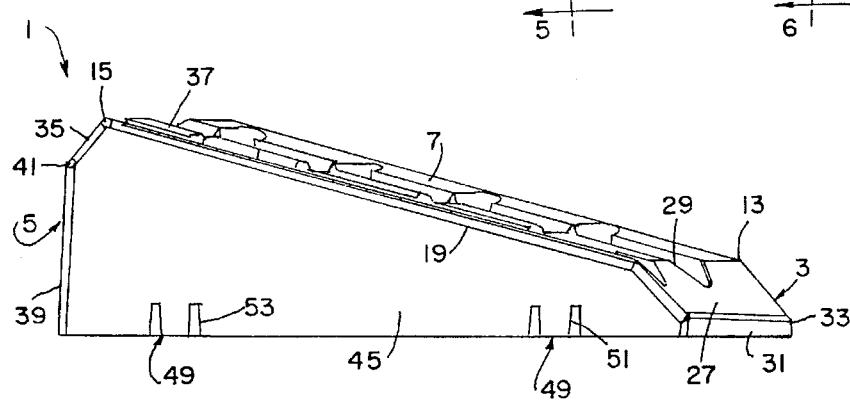
FIG. 3 is a left side view of the transfer station of FIG. 1.
Figure 4:
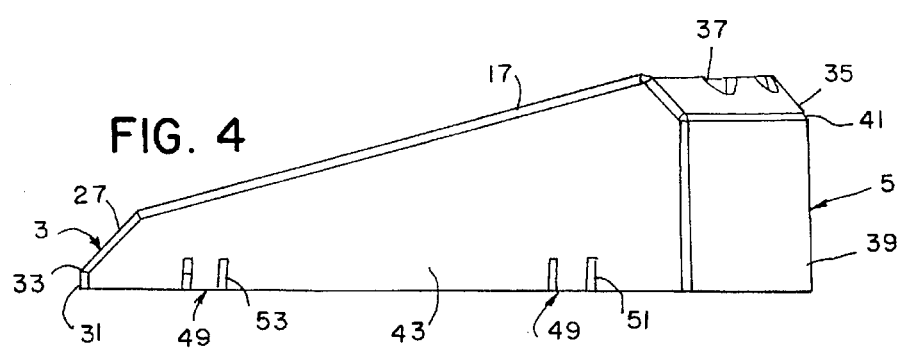
FIG. 4 is a right side view of the transfer station of FIG. 1.

FIGS. 3 and 4 show preferred shapes for the front 3 and back 5 of the station 1. The front 3 includes a first part 27 that slopes outward and downward from the front edge 13 of the base 7. The first part 27 has curved parts 29 corresponding in position to the location of the curved depressions 23. A substantially vertical part 31 extends downward from the lower edge 33 of the first part 27. The back 5 includes a first segment 35 that slopes outward and downward from the back edge 15 of the base 5. The first segment 35 also has curved regions 37 corresponding in position to the location of the curved depressions 23. A substantially vertical segment 39 extends downward from the bottom edge 41 of the first segment 35.

As shown in FIGS. 3 and 4, preferred embodiments of the station 1 have sides 43, 45 extending from and connecting to side edges of the base 7, the front 3 and the back 5. The sides 43, 45 are preferably generally vertical.

As shown in FIGS. 1 and 2, when the front edge 13 and back edge 15 of the base 7 are curved, the base 7 becomes progressively wider from front to back. The front 3 and back 5 of the station 1 follow that defined curvature, and the back 5 therefore spans slightly wider than the front 3. The sides 43, 45 angle slightly inward from back to front to join the back 5 of the station 1 to the front 3 and to follow along the side edges 17, 19 of the base 7.

Connectors 49 are positioned on the sides 43, 45 for connecting multiple stations together. In a preferred embodiment the connectors 49 are ant-skid feet that engage apertures in the side of an adjoining station. FIGS. 3 and 4 show a preferred embodiment of the present invention having two pairs 51, 53 of connectors positioned on each side, with the pairs on one side including multiple feet and the pairs on the opposite side including multiple apertures for receiving the feet. Other arrangements, numbers and kinds of connectors are envisioned as possible.

Figure 5:
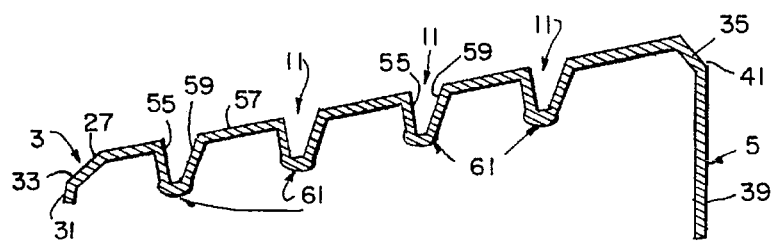
FIG. 5 is a cross-sectional view of the transfer station taken along line A—A of FIG. 2.
Figure 6:
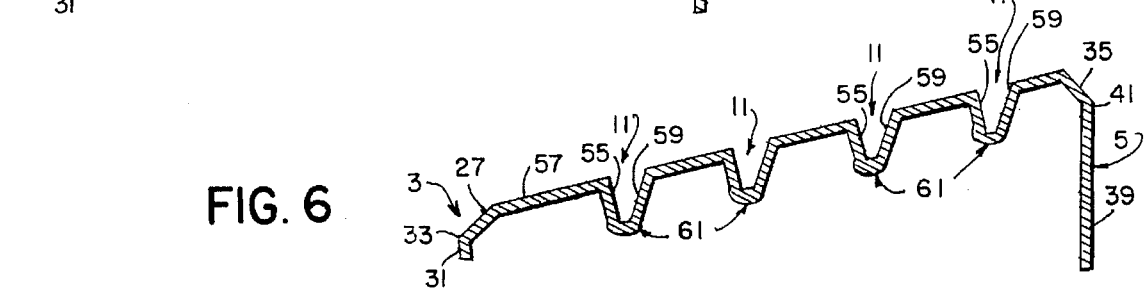
FIG. 6 is a cross-sectional view of the transfer station taken along line B—B of FIG. 2.

FIGS. 5 and 6 are cross-sectional views of the station of FIG. 2 taken across central regions 25 of the pockets 11 of the adjacent rows 9. Each pocket 11 has a first wall 55 extending inward and downward from the upper surface 57 of the disc-receiving base 7 towards the center of the pocket 11 and a second wall 59, opposite the first wall 55, that also extends inward and downward from the upper surface 57 of the disc-receiving base 7 towards the center of the pocket 11. A trough 61 is positioned between and connected to bottoms of the first wall 55 and second wall 59 of each pocket 11. The trough 61 preferably has dimensions for receiving lower sides and edges of a disc and for only contacting non-recorded surfaces of the disc.

Figure 7:
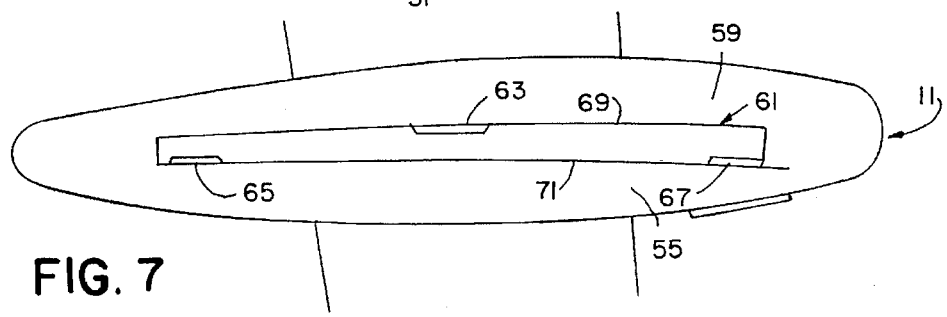
FIG. 7 shows a preferred embodiment of a pocket having three bumps for orienting a disc in a rearwardly-tilting position.

As shown in FIG. 2, and more clearly in FIG. 7, each pocket 11 has multiple bumps extending inward for orienting the disc in a rearwardly-tilting position. In a preferred embodiment, the trough 61 of each pocket 11 has a single rear bump 63 and a pair of front bumps 65, 67. The rear bump 63 is positioned near the middle of the back wall 69 of the trough 61. The two front bumps 65, 67 are positioned on outer edges of the front wall 71 of the trough 61. The rear bump 63 is also preferably positioned deeper in the trough 61 than the pair of front bumps 65, 67. That arrangement allows for the rear bump 63 to push a lowest, nonrecorded edge adjacent the recorded surface of a disc forward and for the pair of front bumps 65, 67 to push the front, nonrecorded surface of the disc backwards, thereby slightly tilting the disc backwards.

In another preferred embodiment of the present invention, the pockets 11 are straight slots having that are molded at an angle of preferred tilt or inclination.

Figure 8:
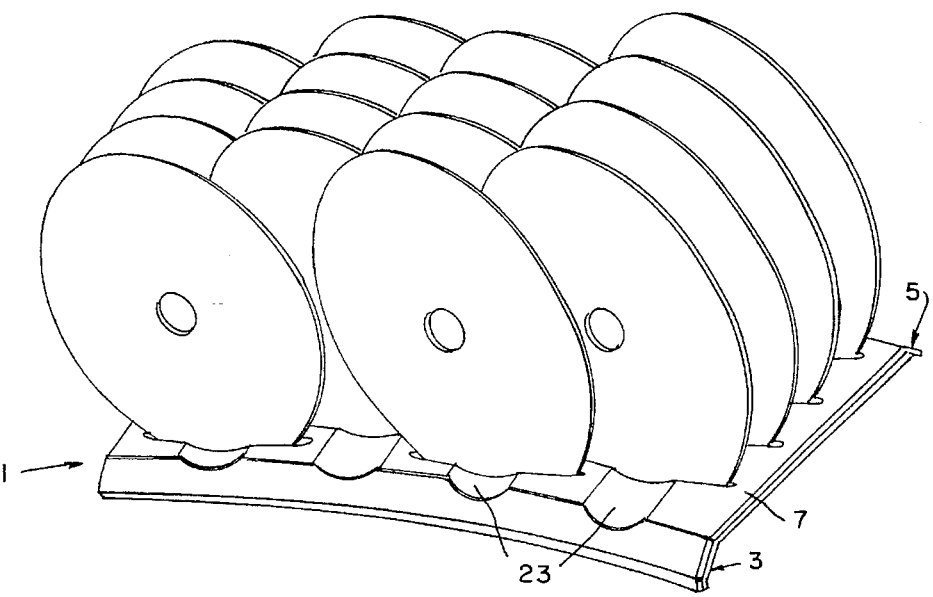
FIG. 8 shows another preferred embodiment of the present invention including a disc-receiving base having four rows of pockets.
Figure 9:
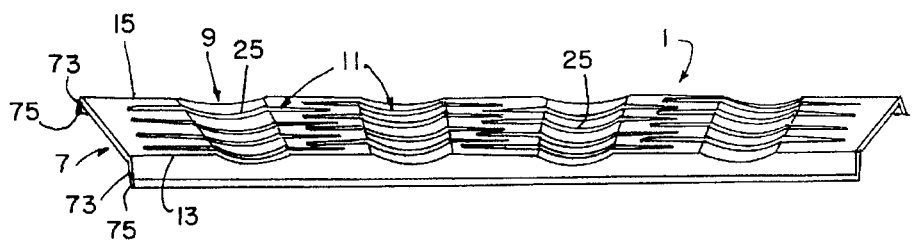
FIG. 9 is a front view of the transfer station of FIG. 8.
Figure 10:
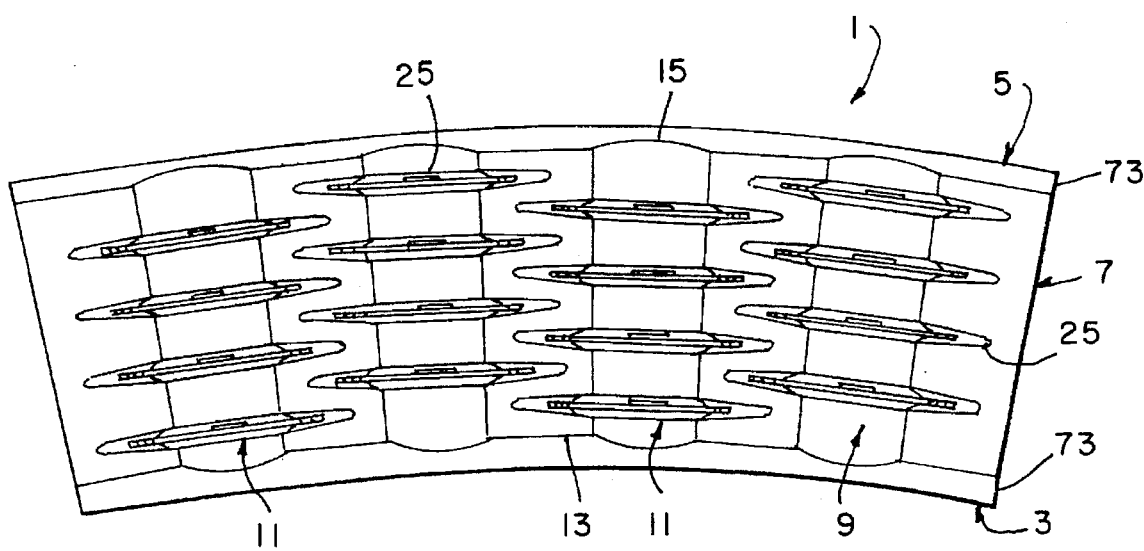
FIG. 10 is a plan view of the transfer station of FIG. 8.

FIGS. 8–10 show another preferred embodiment of the present invention having a disc-receiving base 7 that has four rows of pockets 11 and curved depressions 23 extending through central regions 25 of each row 9 of pockets 11. The base 7 is generally parallel to the supporting surface. The front 3 extends outward and downward from the front edge 13 of the base 7 and the back 5 extends outward and downward from the back edge 15 of the base 7. Both the front 3 and the back 5 each include a large part 73 that extends from the front 13 and back 15 edges of the base 7, respectively, and a smaller, generally vertical footing 75.

As shown in FIGS. 8–10, the station 1 has no sides. The front 3 and back 5 are curved, and the curved depressions 23 follow the radii of curvature of the front 3 and back 5 of the station 1.

While the invention has been described with reference to specific embodiments, modifications and variations of the invention may be constructed without departing from the scope of the invention, which is defined in the following claims.

We claim:

1. A disc holder apparatus for storing and displaying compact discs comprising a disc-receiving base having a front edge, a back edge, a left edge and a right edge, a support extending downward from the disc-receiving base, and pockets for receiving compact discs positioned in the disc-receiving base, each pocket further comprising a first lead wall extending inward and downward from the disc-receiving base toward a center of the pocket, a second lead wall extending inward and downward from the disc-receiving base toward the center of the pocket, and a trough connected to and positioned between bottoms of the first and second lead walls for receiving lower sides and edges of a disc, the trough having dimensions for contacting non-recorded, flat surfaces of the disc.

2. The apparatus of claim 1, wherein the pockets are arranged in rows extending between the back edge and the front edge.

3. The apparatus of claim 2, wherein the pockets are arranged in first and second rows, and wherein the pockets in adjacent rows are staggered.

4. The apparatus of claim 2, wherein the pockets are arranged in first, second, third and fourth rows, and wherein the pockets in adjacent rows are staggered such that the pockets in the first and third rows are generally aligned and the pockets in the second and fourth rows are generally aligned.

5. The apparatus of claim 2, further comprising curved depressions extending from the front edge to the back edge of the disc-receiving base of the station, and wherein a number of depressions equals a number of rows, and wherein one depression extends through central regions of the pockets in each row.

6. The apparatus of claim 1, wherein the support further comprises a front extending downward from the front edge of the disc-receiving base and a back extending downward from the back edge of the disc-receiving base.

7. The apparatus of claim 6, wherein the back is taller than the front and wherein the disc-receiving base slopes downward from the back edge to the front edge.

8. The apparatus of claim 6, wherein the front and the back are curved and wherein the front and back edges of the disc-receiving base are also curved to follow the front and back.

9. The apparatus of claim 8, wherein the pockets are arranged in rows extending between the back edge to the front edge, wherein the back is taller than the front, and wherein the disc-receiving base slopes downward from the back to the front, and further comprising curved depressions extending from the front edge to the back edge in the disc-receiving base, wherein a number of depressions equals a number of rows, wherein one depression extends through central regions of the pockets in each row and wherein the depressions follow radii of curvature of the front and back edges of the disc-receiving base.

10. The apparatus of claim 1, wherein the support further comprises sides extending downward from side edges of the disc-receiving base.

11. The apparatus of claim 10, further comprising at least one connector positioned on at least one of the sides for connecting multiple stations together.

12. The apparatus of claim 11, wherein the at least one connector is an anti-skid foot.

13. The apparatus of claim 1, wherein the support further comprises a front extending downward from a front edge of the disc-receiving base and a back extending downward from the back edge of the disc-receiving base, and wherein the front further comprises a first upper part that slopes outward and downward from the front edge of the base and wherein the back further comprises a first upper segment that slopes outward and downward from the back edge of the base.

14. The apparatus of claim 13, wherein the front further comprises a substantially vertical lower part extending downward from a lower edge of the first upper part and wherein the back further comprises a substantially vertical lower segment extending downward from a bottom edge of the first upper segment.

15. The apparatus of claim 14, further comprising side walls extending downward from side edges of the base, and wherein each side wall joins outer edges of the front and the back.

16. The apparatus of claim 1, wherein each trough has a width that is greater than a width of a standard compact disc.

17. The apparatus of claim 1, further comprising multiple bumps extending inward from each trough for orienting a compact disc at a backward-tilting angle.

18. The apparatus of claim 17, wherein each trough has a front wall and a back wall, and wherein the multiple bumps include three bumps, with a first bump extending rearward from a left side of the front wall, a second bump extending rearward from a right side of the front wall and a third bump extending forward from a middle portion of the back wall.

19. The apparatus of claim 17, wherein the third bump is positioned at a lower portion of the trough such that the third bump pushes a lowest part of a compact disc forward when the disc is fully inserted in the trough, and wherein the first and second bumps extend rearward at a position above the third bump for pushing a front, nonrecorded flat side of the compact disc backwards.

20. The apparatus of claim 1, wherein each trough is a generally straight slot having front and back walls extending downward, substantially parallel to one other, and having curved upper edges.

21. The apparatus of claim 1, wherein each trough is approximately 0.045 inch deep.

22. A disc holder apparatus for storing and displaying compact discs comprising a disc-receiving base having a front edge, a back edge, a left edge and a right edge, a support extending downward from the disc-receiving base, pockets for receiving compact discs positioned in the disc-receiving base, and curved depressions in the disc-receiving base extending from the front edge to the back edge, wherein each pocket further comprises a first lead wall extending inward and downward from the disc-receiving base toward a center of the pocket, a second lead wall extending inward and downward from the disc-receiving base toward the center of the pocket, and a trough connected to and positioned between bottoms of the first and second lead walls for receiving lower flat, outer non-information surfaces of a disc, the trough having dimensions and curved upper edges for contacting non-information flat surfaces of the disc, wherein the pockets are arranged in rows extending between the back edge to the front edge of the station, wherein the back edge is higher than the front edge, wherein the disc-receiving base slopes downward from the back edge to the front edge, wherein the front edge and the back edge are curved, wherein the depressions are centered in the rows of pockets, wherein one depression extends through central regions of the pockets in one row and wherein the depressions follow radii of curvature of the front and back edges of the disc-receiving base and follow rows of the pockets for receiving compact discs in the disc-receiving base.

23. A multiple transfer station assembly comprising multiple transfer stations connected together by connectors, wherein each station further comprises a disc-receiving base having a front edge, a back edge, a left edge and a right edge, a support extending downward from the disc-receiving base, and pockets for receiving compact discs positioned in the disc-receiving base, each pocket further comprising a first wall extending inward and downward from the disc-receiving base toward a center of the pocket, a second wall extending inward and downward from the disc-receiving base toward the center of the pocket, and a trough connected to and positioned between bottoms of the first and second walls for receiving peripheral flat side portion and edge of a disc, the trough having dimensions for contacting a non-recorded surface of the disc.

\* \* \* \* \*